Patented Apr. 20, 1937

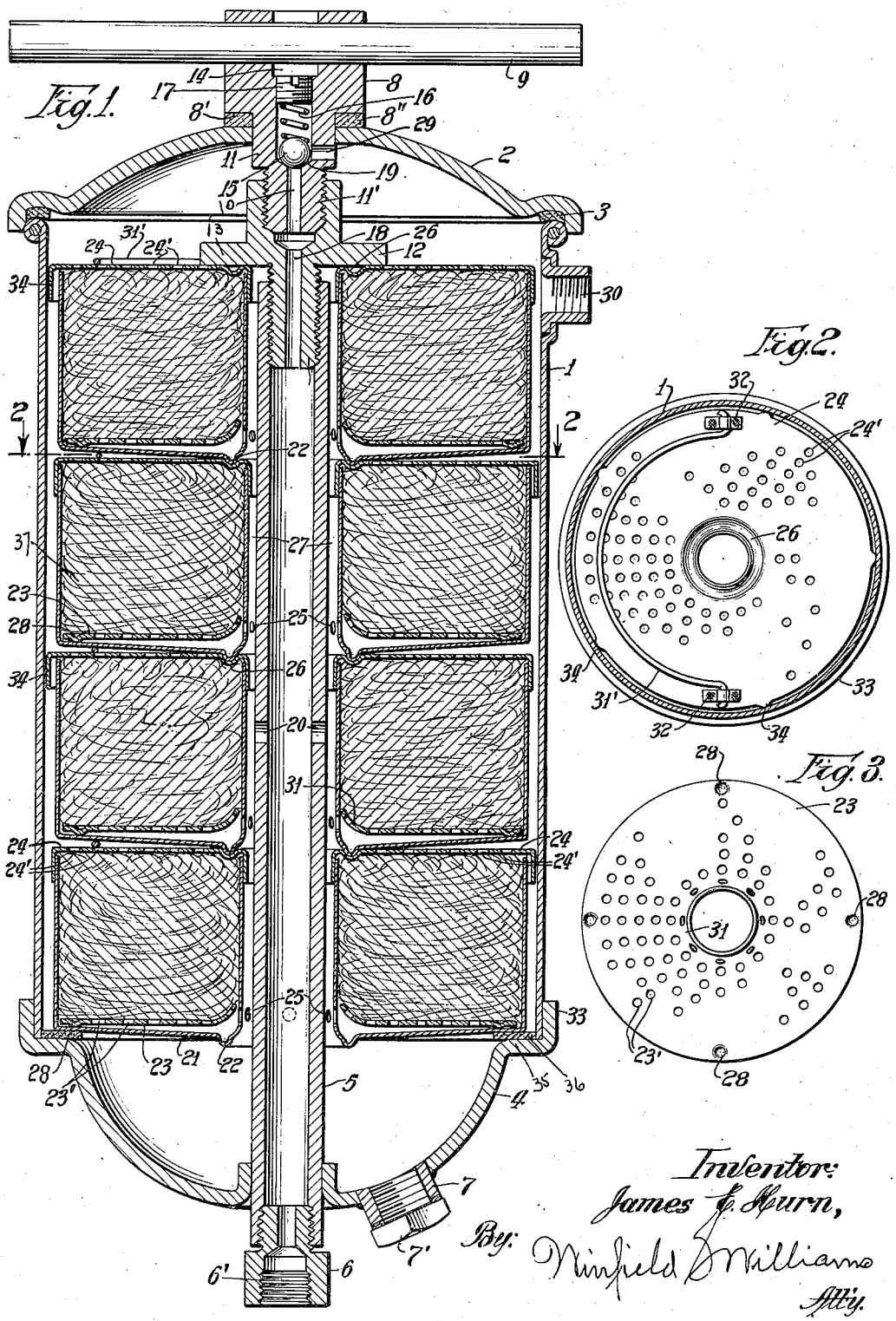

2,077,999

UNITED STATES PATENT OFFICE 2,077,999

FILTER

James E. Hurn, Saugerties, N. Y., assignor to The DeLuxe Products Corporation, La Porte, Ind.

Application June 4, 1935, Serial No. 24,841

6 Claims. (Cl. 210—179)

My invention is a method and a mechanism for clarifying and filtering of the lubricating oil in an internal combustion engine, during the operation of the engine; and delivering the said oil back to the oil reservoir of the engine substantially at its initial purity.

My device is an improvement upon my former application S. N. 702,529; filed December 15, 1933; and involves the basic principles contained therein.

An important object is the construction of a housing which can be readily demounted, one or all of its filtering portions removed, and renewal filtering portions immediately installed. Another object is the provision of a series of super-imposed filtering units adapted to be practically free from channelling of the oil in the filtering units, thereby maintaining fresh and efficient units in the filtering process.

Other objects will become very apparent to the skilled observer.

An embodiment of my device is shown in the accompanying drawing:

Fig. 1 is a vertical sectional elevation of the device, showing the internal working arrangement.

Fig. 2 is a cross section of Fig. 1, taken in the direction of the arrows 2—2.

Fig. 3 is a plan view of a disc seated in each individual unit shown in Fig. 2.

As illustrated, the housing consists of three main parts, of which 1 is a cylindrical body, adapted to contain the major working parts of the device, demountably positioned over the chamber 4 (which is denominated a sump) and enclosed by a top cover 2 seated upon a gasket 3 on the rim or edge of the cylindrical wall 1. 5 is a tubular member fixedly seated in the bottom of the sump 4 and extends up thru the central portion of the housing to a point slightly spaced below the rim of wall 1; the end portions of said tube 5 being threaded. Into the lower end of the tube 5 there is threadedly inserted a nozzle 6, having an aperture therethru whose smallest diameter is practically equal to the diameter of a bore running through a locknut member 12 which is threaded into the upper end of tube 5; 6' is a threaded entreport into nozzle 6. In the lower portion of the sump 4 there is an outlet 7 regulated by a nut 7' which outlet 7 is provided to clean the sump 4 of sludge accumulation. 8 is a nut for locking the cover 2 to the cylindrical portion 1 of the housing; 8' is a shoulder upon the nut 8 adapted to be seated upon a fluid tight gasket 8'' in contact with the cover 2: 9 is a bar passing thru the nut 8 and adapted for leverage in manipulating nut 8. A portion 11 of nut 8 extends into the chamber of the housing and has a reduced threaded portion 11' for locking into a nut 12. 12 is a locking nut provided to securely lock in the filtering units to be hereinafter described; the said nut being threaded at either end and having a flange 13 substantially central thereof. A bore 14 in nut 8 extends to a valve seat 19 then thru a smaller bore 10 which registers with a bore 18 in nut 12. A valve 15 is seated in nut 8 tensioned by a spring 16 and a tensioning nut 17; a lateral bore 29 extends from the bore 14 thru one side of the nut 8, slightly spaced from the valve seat 19. In the central tube 5 I provide lateral apertures 20 communicating between the chamber of the tube 5 and a channel 27 surrounding the tube 5. Demountably assembled in the housing 1 and surrounding the tube 5, spacedly held apart from the tube 5 and the internal wall of the housing 1, I provide a series of unit container elements 21 adapted to be superimposed one upon the other, the lowest one resting upon a disc or gasket 36; each of these container units consists of a circular body 21 having its bottom slightly inclined from the outer upright wall toward the center, the said bottom terminating in a bead 22; each said unit has a cover 24, and which said cover 24 has a series of projections 34 on its outer wall adapted to space apart each said unit from the wall of the housing 1, also providing a channel between the outer wall of each unit and the internal wall of the housing 1. Seated in the bottom of each said individual unit 21 I provide a disc 23 having perforations 23' therethru, its inner edge 31 slightly upturned against the inner wall of the unit 21, being adapted to be above the apertures 25 in the wall of the unit 40 and intended to deflect the liquid passing thereinto downward and under the said disc 23, there being also nobs 28 on the lower side of each disc 23 adapted to support the outer edge of the disc above the floor of the unit 21. Each cover 24 of a unit has a multiplicity of perforations 24' therethru, and a circular indentation 26, into which indentation bead 22 is adapted to be seated to fixedly position each superimposed unit. In the inside upright wall of each unit I provide a series of perforations 25 there-around. 30 is the oil outlet in the upper wall of the housing, slightly spaced from the rim of the housing. 31' is a bail attached to the cover 24 by cleats 32 adapted to lift the individual unit 23 and its cover 24. 33 is a flanged extension of the sump 4 adapted to be the retaining wall for the bottom of the housing 1 and sealed by a gasket 36 resting upon a seating 35 in the sump 4. 37 is filtering material, preferably some form of a fibre, or such like material.

The operative principles involved in the device include a filter in which there are demountable unit portions each imposed upon the other, in combination with a base filter, and each separately removable when an individual unit suggests removal and replacement by a new member. The oil enters 6 under engine pressure, is projected fountain-like into the chamber of 5, homogenizing the ingredients; this homogenized oil is forced thru apertures 20 against the blank wall of a filter element 21 cracking and disintegrating it and sharply reducing its velocity and simultaneously precipitating its heavier and deleterious ingredients toward the sump 4, and away from the travel of the oil; the oil being lighter, passes into the individual unit container and is there filtered then passing out of the container top to the channel between the container outer wall and the wall of the housing, then out through the outlet back to the crankcase.

The device is so arranged that each individual unit of the filtering sections can readily be removed; for instance, simply removing the locking device 8 the cover will be immediately removable, then by taking out the nut 12 each unit can be removed separately and such new units as may be desired may be easily replaced with a minimum of mess or dirt; if it be desired to change all of the units at one time, on removal of the nut 12 the whole housing down to the sump portion may be removed away from any contact with the deleterious deposit in the sump. The individual units may be emptied of their filtering material and new filtering material placed therein, which can be done at a minimum of expense, maximum of efficiency, and by the most ordinary unskilled person.

I claim:

1. A filter comprising a housing enclosing a chamber closed by a removable cover; the lower portion of the chamber providing a sump, the upper portion of the chamber providing a filtered oil area; a tubular member vertically positioned axially of the housing containing an oil inlet to the chamber; locking means associated with the cover adapted to cooperate with the tubular member whereby the parts are lockingly sealed into a unit; a mounting series of individual unit filtering members positioned above the sump and axially positioned with reference to the tubular member, there being a clearance space between the tubular member and the adjacent filtering units; outlets from each filtering unit communicating with a spaced area between the outside walls of the filtering units and the enclosing wall of the housing, the said spaced area communicating with the filtered oil area; an outlet from the filtered oil area.

2. A filter comprising a housing enclosing a chamber closable by a removable cover; a tubular chamber axially positioned in the housing and fixedly seated in the bottom of the housing, having means to cooperate with a locking means associated with the cover for sealing the chamber; there being in the locking means a valve predetermining the pressure of the oil within the tubular chamber; a sump in the bottom of the chamber; filtering means mounted above the sump coaxial around the tubular member; an oil inlet into the chamber, and an oil outlet from the chamber.

3. A filter comprising a housing enclosing a chamber closable by a removable cover; a tubular member axially positioned in the housing and fixedly seated in the bottom of the housing, having means to cooperate with a locking means associated with the cover for sealing the chamber; a sump in the bottom of the chamber; filtering means mounted above the sump coaxial around the tubular member; an oil inlet through the tubular member and an oil outlet from the chamber; means associated with the fixedly seated member and the cover locking member for automatically regulating the pressure of the oil entering the chamber.

4. In a device for purifying oil a housing enclosing a chamber containing a sump, filtering means mounted above the sump, a cleansed oil space with an outlet therefrom in the upper part of the chamber, a tubular chamber substantially axial of the housing chamber having at its bottom portion an inlet to the tubular chamber from the lubrication reservoir of an engine, said chamber having associated at its upper end a valve for predetermining the maximum fluid pressure within the tubular chamber, a plurality of individual filtering members coaxial with said tubular chamber there being a clearance space around the tubular member separating the filtering members from the tubular member and providing a liquid passage therethrough, means to agitate the liquid to homogeneity in the tubular chamber, means to forcibly impinge the homogenized liquid against a solid surface cracking and disintegrating the fluid into the clearance space, means to separate out of the liquid the heavier ingredients into a sump apart from the lighter portions of the fluid, means to pass the lighter portions of the fluid into a plurality of individual filtering units and through the same to a channel back to the reservoir of the engine.

5. A filter adapted to filter oil, comprising a housing, a central tube within the housing from which incoming oil to be filtered is fed, a removable cover, a plurality of individual filtering units containing a mass of filtering medium packed tightly enough to filter the oil without channeling, superimposed about the tube, each of said units having means for admitting oil communicating with the tube, means for removing oil from the housing, said units being arranged within the casing to be all removable through said cover.

6. A filter as set forth in claim 5 in which the filtering medium is a mass of fibrous material.

JAMES E. HURN.